(No Model.)
A. W. TROTTER.
FURROW CLOSING ATTACHMENT FOR CORN PLANTERS.
No. 491,390. Patented Feb. 7, 1893.
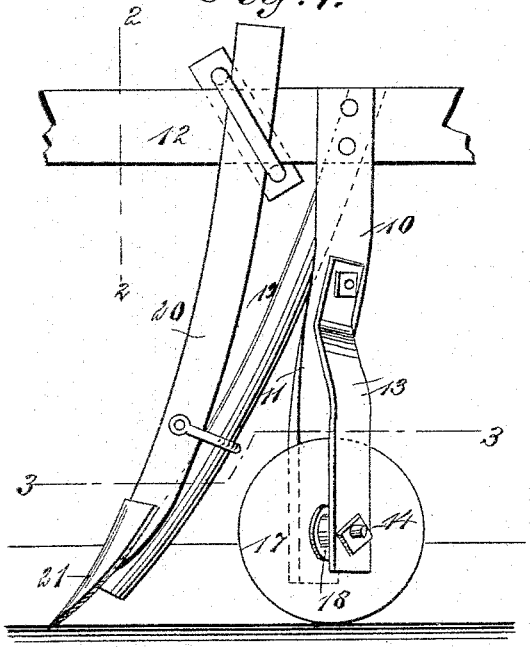
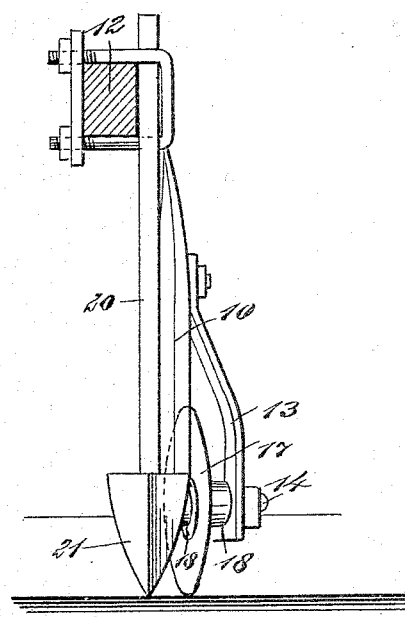
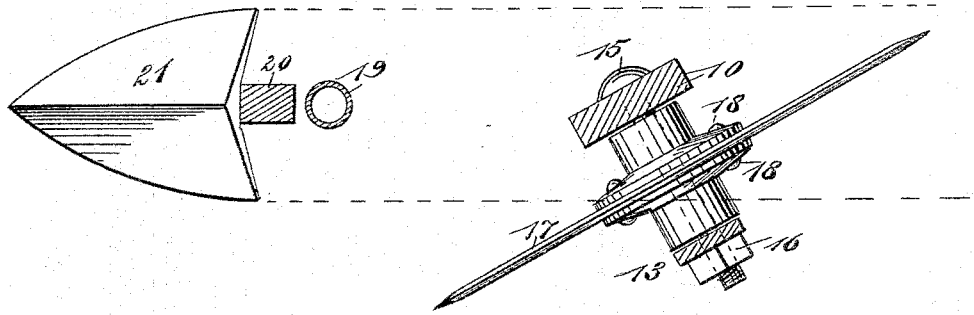
WITNESSES:
Chas. Nida
E. M. Clark
INVENTOR.
A. W. Trotter
BY Munn & Co
ATTORNEYS.

UNITED STATES PATENT OFFICE.

ANDREW WASHINGTON TROTTER, OF PETERSVILLE, INDIANA.

FURROW-CLOSING ATTACHMENT FOR CORN-PLANTERS.

SPECIFICATION forming part of Letters Patent No. 491,390, dated February 7, 1893.

Application filed November 5, 1892. Serial No. 451,043. (No model.)

*To all whom it may concern:*

Be it known that I, ANDREW WASHINGTON TROTTER, of Petersville, in the county of Bartholomew and State of Indiana, have invented a new and Improved Furrow-Closing Attachment for Corn-Planters, of which the following is a full, clear, and exact description.

My invention relates to a furrow-closing attachment for corn planters and like machines, and has for its object to provide a device of exceedingly simple and durable construction, which will act continuously, while the planter is in operation, to close the furrow and thereby distribute the soil evenly over the seeds that have been dropped in the furrow.

The invention consists in the novel construction and combination of the several parts, as will be hereinafter fully set forth and pointed out in the claim.

Reference is to be had to the accompanying drawings forming a part of this specification, in which similar figures of reference indicate corresponding parts in all the views.

Figure 1 is a side elevation of the attachment, illustrating the relative position it occupies as to the plow and seed-distributing tube; Fig. 2 is a vertical section through the beam, taken practically on the line 2—2 of Fig. 1, the plow and the attachment being in front elevation; and Fig. 3 is a horizontal section taken essentially on the line 3—3 of Fig. 1.

The attachment consists of a standard 10, which standard is given a twist above its center, as shown at 11 in the drawings, the said twist serving to throw the lower end of the standard out of the plane of the upper end, the upper end of the standard having an inward and the lower end an outward inclination, the upper end of the standard being adapted to stand parallel with the beam 12 of the planter, while the lower end stands somewhat at an angle to the said beam.

Upon the outer surface of the standard 10 a strap 13, is secured, and this strap arches outward and downward from the standard, and through the lower end of the strap one end of a short shaft 14, is passed, the other end of the shaft being rigidly yet removably secured in the lower end of the standard, and this rigid attachment to the standard may be effected by squaring the end of the shaft passing through the standard, and likewise producing a correspondingly shaped opening in the standard to receive the shaft. Ordinarily the shaft is provided at its squared end with a head 15, while the opposite end is threaded to receive a lock nut 16, the said lock nut being screwed to an engagement with the strap, as is best shown in Fig. 3.

By reason of the inclination given to the lower end of the standard, the shaft 14, stands at somewhat of an acute angle to the longitudinal axis of the beam 12, as is best shown in Fig. 3; and the shaft between the standard and the strap is adapted to carry a disk wheel 17, the periphery of which is more or less sharpened to produce a cutting edge; this disk wheel is usually attached to two hubs 18, the hubs being secured to opposite sides of the wheel, and they turn loosely upon the shaft. The hubs are of such length that no lateral movement is possible for the wheel and the hubs upon the shaft.

In applying the attachment the upper end of the standard is bolted rigidly to one side of the beam 12, back of the seed-conducting tube 19 and the shank 20 with which the tube is connected, the shank carrying at its lower end any approved form of plow 21. The travel of the disk wheel is at an angle to the path pursued by the plow, and as the machine is advanced the plow creates the furrow, the seed is deposited in the furrow in any approved manner, and the disk wheel, which follows, revolves diagonally across the furrow and causes the earth to be fed in a steady stream from one side of the furrow over the seed, effecting a perfect covering of the latter.

The attachment may be readily applied or removed, as the standard is secured to the beam by means of bolts or their equivalents.

Having thus described my invention, I claim as new, and desire to secure by Letters Patent,—

The combination, with a standard, the plow, the support for the plow and the seed-dropping tube located at the rear of the plow, of a covering attachment located at the rear of the seed drop tube, comprising a standard secured at its upper end to a fixed support upon the planter, and a covering wheel located at the rear of the lower end of the seed drop tube and standing at an angle to the path of said tube and diagonally across the furrow created by the plow, as and for the purpose specified.

ANDREW WASHINGTON TROTTER.

Witnesses:
B. FITZPATRICK,
FRANK STAPP.